United States Patent [19]

Enrietti

[11] Patent Number: 4,974,285
[45] Date of Patent: Dec. 4, 1990

[54] DEVICE FOR ASSISTING IN THE OPENING AND CLOSING OF PIVOTABLY MOUNTED MEMBERS

[75] Inventor: Leo Enrietti, Aostatal, Italy
[73] Assignee: A. Raymond, Fed. Rep. of Germany
[21] Appl. No.: 350,231
[22] Filed: May 11, 1989
[30] Foreign Application Priority Data
  May 11, 1988 [DE] Fed. Rep. of Germany ....... 3816091
[51] Int. Cl.⁵ .............................................. E05F 3/00
[52] U.S. Cl. ............................................ 16/66; 16/84
[58] Field of Search ..................... 16/66, DIG. 17, 84

[56] References Cited

U.S. PATENT DOCUMENTS

| | | | |
|---|---|---|---|
| 1,334,081 | 3/1920 | Coffman | 16/66 |
| 3,105,264 | 10/1963 | Truhon | 16/66 |
| 4,629,167 | 12/1986 | Kimura et al. | 16/66 |

*Primary Examiner*—Richard K. Seidel
*Assistant Examiner*—Carmine Cuda
*Attorney, Agent, or Firm*—Finnegan, Henderson, Farabow, Garrett & Dunner

[57] ABSTRACT

A device for assisting in the opening and closing of a pivotally mounted member comprising an elongated housing having a closed end and an open end and an inner annular cylindrical space. An annular cylindrical slide having an inner and an outer end is slidably mounted in the space for longitudinal movement into and out of the housing and a spring centrally mounted between the housing and the slide retains the slide in the housing in a retracted position. Braking devices are provided for retarding movement of the slide in either direction that include nozzle-shaped orifices communicating the inner space with the outside of the housing so that air has to flow into and out of said orifice as the slide moves relative to the housing. Locking devices hold the slide in an extended position, the locking devices being releaseable by pulling the slide out of the housing a short distance, and journal devices are at the outer end of the slide for connecting the slide to a pivotally mounted member.

2 Claims, 1 Drawing Sheet

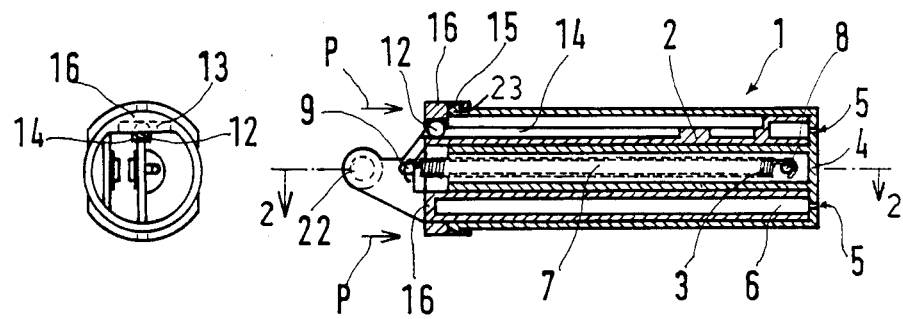
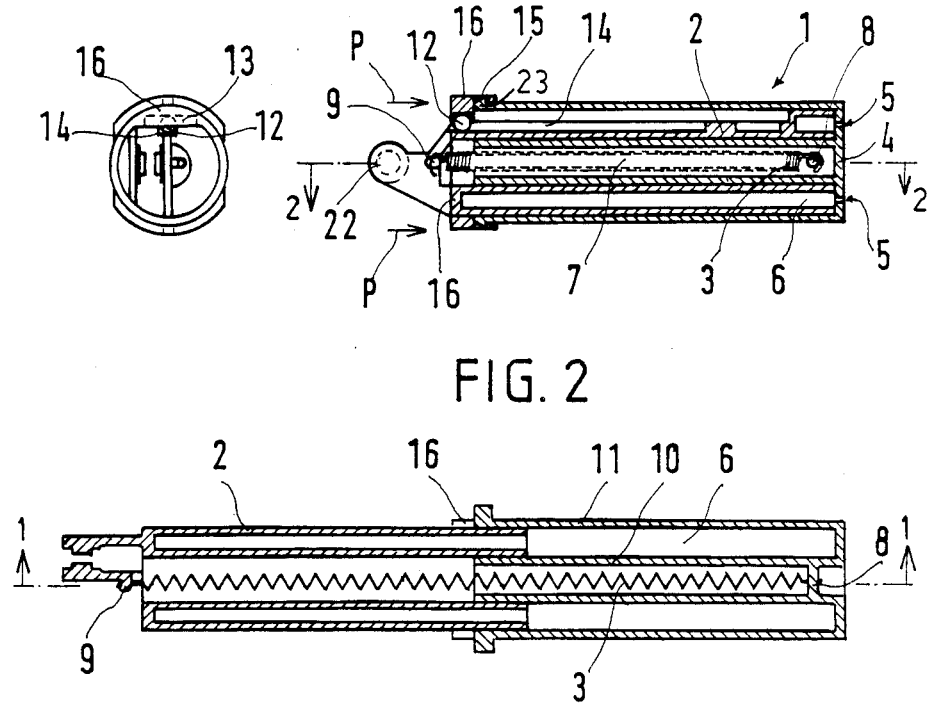
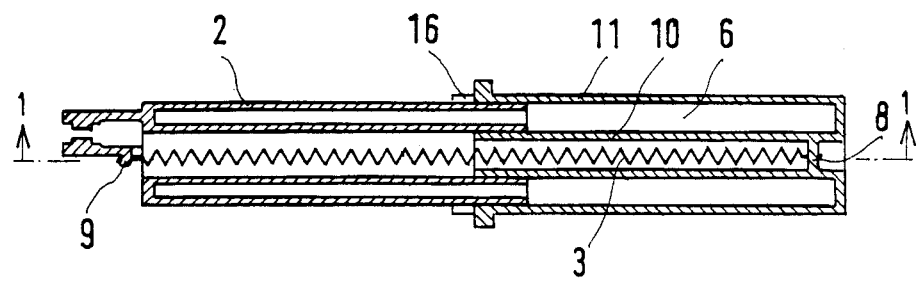
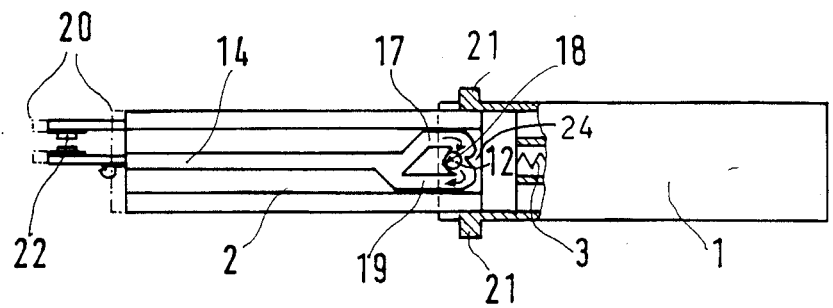

DEVICE FOR ASSISTING IN THE OPENING AND CLOSING OF PIVOTABLY MOUNTED MEMBERS

BACKGROUND OF THE INVENTION

This invention relates to a device for assisting in the opening and closing of pivotably mounted lids, coverplates and the like. It can serve, for example, in automobiles, as an actuating device for the lid of a ashtray when it is being swung out.

Devices of this type consist essentially of an elongated housing and a slide that is guided displaceably therein and is retained in its retracted position by a helical spring. A braking mechanism is provided that has to be overcome in the two directions of movement of the slide and the slide is fixed in the extended position by means of a locking mechanism, which is releaseable by again pulling the slide out a short way. For opening a lid, the device has the advantage that, after the lid edge has been pressed down briefly, the opening movement, which takes place by the slide moving from its extended position to its retracted position, occurs automatically by the helical spring. When the lid is closed, the helical spring is tensioned again and retained in the tensioned position by the locking mechanism.

In a known device of this type the slide is guided in a housing having a rectangular cross-section and has on its underside a braking mechanism comprising a rack that engages, via a pinion mounted in the housing and its shaft, a pot filled with a silicone mass, whereby the momentum of the shaft is partially expended. Because of the many individual parts, this device is very expensive to produce and its possibilities of use are therefore also restricted.

With a view to lowering production costs of the above-mentioned type of device, which is desirable for mass-produced articles, of the above-mentioned type of device, an object of the invention is to provide such a device with a reduced number of individual parts that can be more easily molded and readily assembled.

SUMMARY OF THE INVENTION

This object is achieved by providing a device for assisting in the opening and closing of a pivotally mounted member comprising an elongated housing having a closed end and an open end and an inner cylindrical space, a cylindrical slide having an inner and an outer end slidably mounted in the space for longitudinal movement into and out of said housing, spring means mounted between the housing and the slide for retaining the slide in the housing in a retracted position, braking means for retarding movement of the slide in either direction comprising at least one nozzle-shaped orifice communicating the inner space with the outside of the housing so that air has to flow into and out of said orifice as the slide moves relative to the housing, locking means for holding the slide in an extended position, said locking means being releasable by pulling the slide out of the housing a short distance, and journal means at the outer end of the slide for connecting the slide to a pivotally mounted member.

BRIEF DESCRIPTION OF THE DRAWINGS

An exemplary embodiment of the device is illustrated in the drawings which will be explained in more detail below. In the drawings:

FIG. 1 is a longitudinal sectional view of the device in a retracted position and is a view taken along the line I—I of FIG. 2;

FIG. 2 is a longitudinal sectional view taken along the line II—II of FIG. 1 but with the device in an extended position;

FIG. 3 is a top view showing the device in an extended position as in FIG. 2, but only partially in section in the locking region; and FIG. 4 is a front view of the device.

DETAILED DESCRIPTION OF THE INVENTION

The device illustrated in the drawings consists of a cylindrical housing 1 and a cylindrical slide 2 of annular cross-section that is slidably mounted in an annular cylindrical space 6 in the housing for longitudinal movement therein in a piston-like manner. Slide 2 is retained in its retracted position by spring means such as a helical spring 3 that is mounted in a central, cylindrical recess 7 in housing 1. Helical spring 3 acts between a crosspiece 8 in housing 1 at one end and a hook 9 on the slide 2 at the other end. Recess 7 is surrounded by a inner cylindrical wall 10, so that annular slide 2 is guided displaceably in the annular cylinder space 6 of housing 1 between outer cylinder wall 11 and inner cylinder wall 10. By providing an annular slide and centrally locating the spring, the slide can be moved into and out of the housing without danger of tilting or binding.

In accordance with the invention, braking means are provided for retarding movement of slide 2 in either direction. As embodied, this means comprises at least one nozzle-shaped orifice communicating the outside of housing 1 with annular cylindrical space 6 so that air has to flow into and out of the orifice as the slide moves relative to the housing. Preferably, in end wall 4 of housing 1 there are two small nozzle-shaped orifices 5, through which air can flow into cylindrical space 6 of housing 1 and also escape therefrom.

To fix slide 2 in its extended position as shown in FIG. 2, there is provided a locking means which is releasable by pulling the slide out of the housing a short distance. As embodied this means is formed by the positive guidance, described in detail below, of a ball 12. Ball 12 is located in a transverse groove 13 in a sleeve 16 fitted over the open end of housing 1 in the direction of the arrows P and held in place by locking noses 15 which engage cooperating barbs 23 on the outer surface of housing 1. The ball is captured between groove 13, so as to be displaceble transversely therein, and an essentially axis-parallel groove 14 in slide 2 so that it is displaceable longitudinally therein as the slide is moved in and out of housing 1.

As shown in FIG. 3, groove 14 forks at the far or inner end of slide 2, in such a way that, when slide 2 is being pulled out, ball 12 will first travel down groove 14 and then up along groove 17 around as far as locking notch 18. When the force pulling the slide out is released, helical spring 3 will pull slide 2 back slightly from its outermost position 20, as shown in dot-and-dash lines thereby nesting ball 12 in notch 18 and locking slide 2 in its extended position. When slide 2 is once more pulled out as far as position 20, ball 12 is guided down into lower groove 19 as a result of a cam means comprising a cam surface on a projection 24 opposite notch 18 so that the ball will then roll back into longitudinal groove 14 as slide 2 is retracted under the action of spring 3.

Retracting movement of the slide is a result of the force of spring 3 tensioned during its extension and takes place slowly because the air in the cylindrical space 6 can escape only slowly through the nozzle-shaped orifices 5. Thus, the cross-sectional dimensions of the orifices 5 are such that the cycle of movement is delayed in the desired way.

Housing 1 can be pivotably mounted by means of two laterally projecting journals 21 in a carrier body (not shown), and slide 2 likewise possesses at its front end two journal means 22 which are directed towards one another and which are provided for driving a link rod of a known type which is also not shown. This link rod can then be connected, for example, to a pivotably mounted member such as a flap or lid in such a way that with the device in the extended position such as shown in FIG. 2, when a slight pressure is exerted on the free end of the member, ball 12 will come out of locking notch 18 and spring 3 will pull slide 2 back towards its retracted position, its speed of movement being retarded or checked by the slow escape of air in space 6 through orifices 5. In this way the flap is opened slowly and automatically.

What is claimed is:

1. A device for assisting in the opening and closing of a pivotally mounted member comprising an elongated cylindrical housing having a closed end and an open end and a centrally located inner cylindrical wall so that an inner space of annular cross-section is provided between the inner wall and the housing and a cylindrical recess is provided centrally of the housing, an annular slide having an inner and an outer end and of compatible cross-section slidably mounted in the inner annular space between the inner wall and the housing for longitudinal movement into and out of said housing, a helical spring located in said cylindrical recess that is axially secured at one end to the closed end of the housing and at its opposite end to the outer end of the slide for retaining the slide in the housing in a retracted position, braking means for retarding movement of the slide in either direction comprising at least one nozzle-shaped orifice communicating the inner annular space with the outside of the housing so that air has to flow into and out of said orifice as the slide moves relative to the housing, locking means for holding the slide in an extended position, said locking means comprising a ball rotatably captured between a groove in the open end of the housing that extends transverse to the axis of the housing and a longitudinal groove in the slide along which the ball travels as the slide moves in and out of the housing, said slide groove forking near the inner end of the slide to provide a first path of travel for the ball as the slide is pulled out of the housing to guide it into a locking notch to thereby hold the slide in its extended position under the tension of the spring, and cam means for guiding the ball out of the locking notch when the slide is pulled out of the housing again a short distance and into a second path of travel that returns the ball to the longitudinal groove as the slide moves back into the housing under the tension of the spring and journal means at the outer end of the slide for connecting the slide to a pivotally mounted member.

2. The device of claim 1, including a plurality of nozzle-shaped orifices in the closed end of the housing that communicate with the inner annular space.

* * * * *